United States Patent

Haruta et al.

[11] Patent Number: 5,813,452
[45] Date of Patent: Sep. 29, 1998

[54] COATING COMPOSITION FOR HYDROPHILIZATION AND METHOD FOR HYDROPHILIZATION

[75] Inventors: Yasuhiko Haruta; Katsumi Mitsuishi, both of Hiratsuka; Ichiro Yoshihara, Fujisawa, all of Japan

[73] Assignee: Kansai Paint Co., Ltd., Hyogo-ken, Japan

[21] Appl. No.: 703,895

[22] Filed: Aug. 27, 1996

Related U.S. Application Data

[63] Continuation of Ser. No. 412,866, Mar. 29, 1995, abandoned.

[30] Foreign Application Priority Data

Apr. 1, 1994 [JP] Japan .................................. 6-085300

[51] Int. Cl.$^6$ .................. C09D 133/06; C09D 129/04; C09D 163/00; C09D 167/00
[52] U.S. Cl. .................. 165/133; 165/134.1; 427/388.2; 525/155
[58] Field of Search .............................. 165/133, 134.1; 427/388.2, 388.3, 409, 436; 525/155

[56] References Cited

U.S. PATENT DOCUMENTS

| | | | |
|---|---|---|---|
| 3,935,342 | 1/1976 | Lim | 427/341 |
| 4,390,658 | 6/1983 | Graetz et al. | 524/512 |
| 4,421,789 | 12/1983 | Kaneko et al. | 427/204 |
| 4,503,907 | 3/1985 | Tanaka et al. | 165/133 |
| 4,775,588 | 10/1988 | Ishii et al. | 428/327 |
| 4,783,224 | 11/1988 | Sako et al. | 148/251 |
| 4,830,101 | 5/1989 | Ohara et al. | 165/133 |
| 4,954,372 | 9/1990 | Sako et al. | 427/388.2 |
| 4,957,159 | 9/1990 | Mizoguchi et al. | 165/133 |
| 5,137,067 | 8/1992 | Espeut | 165/133 |
| 5,211,989 | 5/1993 | Clinnin et al. | 427/388.4 |
| 5,280,054 | 1/1994 | Sakai et al. | 523/521 |
| 5,288,770 | 2/1994 | Katayama et al. | 523/201 |
| 5,342,871 | 8/1994 | Clinnin et al. | 524/238 |
| 5,399,192 | 3/1995 | Yamasoe | 106/190.1 |

FOREIGN PATENT DOCUMENTS

| | | |
|---|---|---|
| 0128514A2 | 12/1984 | European Pat. Off. . |
| 55-1347 | 1/1980 | Japan . |
| 57-46000 | 9/1982 | Japan . |
| 58-126989 | 7/1983 | Japan . |
| 59-8372 | 2/1984 | Japan . |
| 59-170170 | 9/1984 | Japan . |
| 59-229197 | 12/1984 | Japan . |
| 61-225044 | 10/1986 | Japan . |
| 62-129366 | 6/1987 | Japan . |
| 62-61078 | 12/1987 | Japan . |
| 63-372 | 1/1988 | Japan . |

*Primary Examiner*—Robert H. Harrison
*Attorney, Agent, or Firm*—Wenderoth, Lind & Ponack, L.L.P.

[57] ABSTRACT

The present invention provides a coating composition for hydrophilization comprising (A) a water-soluble or water-dispersible organic resin, (B) organic resin fine particles described below and (C) a crosslinking agent, and a method for hydrophilization of heat exchanger fins by coating said fins with the above composition. The organic resin fine particles (B) are fine particles having a weight-average particle diameter/number-average particle diameter ratio of 1.2 or less and an average primary particle diameter of 0.1–1.0 $\mu$m, which are obtained by dispersion-polymerizing 100 parts by weight of a monomer mixture consisting of 0.1–10.0% by weight of (a) at least one monomer selected from a polyoxyalkylene chain-containing (meth)acrylate and a (meth)acrylamide, 15.0–45.0% by weight of (b) divinylbenzene, 45.0–84.9% by weight of (c) styrene and 0–39.9% by weight of (d) (meth)acrylic acid, in the presence of 40 parts by weight of a poly(meth)acrylic acid in a lower alcohol.

The composition can form a hydrophilic film superior in retention of hydrophilicity, continuous formability and corrosion resistance.

23 Claims, No Drawings

COATING COMPOSITION FOR HYDROPHILIZATION AND METHOD FOR HYDROPHILIZATION

This application is a continuation of now abandoned Ser. No. 08/412,866 filed Mar. 29, 1995.

The present invention relates to a coating composition for hydrophilization, capable of forming a film superior in retention of hydrophilicity; a method for hydrophilization of heat exchanger fins by the use of said composition; and heat exchanger fins treated with said composition.

In the heat exchangers used in air conditioners, the condensed water produced during air cooling becomes waterdrops and forms a water bridge between the fins of heat exchangers, narrowing the air passages; as a result, various inconveniences arise such as increased resistance to air flow, waste of electric power, generation of noise, scattering of waterdrops and the like. In order to prevent such phenomena, it is now conducted, for example, to impart hydrophilicity to the surfaces of aluminum-made fins (aluminum-made fins are hereinafter referred to simply as fins) to prevent the formation of waterdrops and the bridge made thereby.

As the methods for hydrophilization of the surfaces of fins, there can be cited, for example, (1) a method by boehmite treatment, which is known as a method for treating the surface of aluminum; (2) a method of coating a water glass represented by general formula $mSiO_2/nNa_2O$ [e.g. Japanese Patent Publication No. 1347/1980 and Japanese Patent Application Kokai (Laid-Open) No. 126989/1983]; (3) a method of coating a paint which is a mixture of an organic resin with silica, water glass, aluminum hydroxide, calcium carbonate, titania, etc., or a paint which is a combination of said paint with a surfactant [e.g. Japanese Patent Publication No. 46000/1982, Japanese Patent Publication No. 8372/1984, U.S. Pat. No. 4,503,907 (corresponding to Japanese Patent Publication No. 61078/1987), EP-B- 128, 514 [corresponding to Japanese Patent Application Kokai (Laid-Open) No. 229197/1984 and Japanese Patent Application Kokai (Laid-Open) No. 225044/1986]; and (4) a method of coating a paint comprising an organic-inorganic (silica) composite resin and a surfactant [Japanese Patent Application Kokai (Laid-Open) No. 170170/1984]. Some of these methods are already in practical use.

Thus, some of the techniques for hydrophilization of heat exchangers are in practical use. They, however, need improvements because the plates endowed with hydrophilicity by these techniques, still have problems in retention of hydrophilicity (contact angle to waterdrop, whole-surface wettability with water), corrosion resistance, odor, etc.

In recent years, heat exchangers have become smaller and more lightweight, which has made smaller the distance between fins, and higher hydrophilicity has become necessary for the fins. No sufficient hydrophilicity can be achieved with the above methods (3) and (4).

The method (1) by boehmite treatment has problems in corrosion resistance and further in press workability because the formed film is hard. The method (2) of coating a water glass enables the formation of a film of good hydrophilicity (contact angle of treated fin to waterdrop: 20° or less), but the film becomes powdery with the lapse of time and scatters during air flow, generating a cement-like or chemical-like odor. Moreover, the water glass is hydrolyzed by the condensed water produced during the operation of heat exchanger and the surface of film becomes alkaline, easily causing pitting; besides, it is known that the resulting aluminum hydroxide white powder (a corrosion product) scatters, and this poses an environmental protection problem.

The methods for treatment of the surface of heat exchanger can be classified into two methods, i.e (1) a so-called after-coating method in which an aluminum plate is formed into fins, the fins are assembled, and the assembly is coated with a surface-treating agent (having hydrophilicity and rust-preventive property) by means of dipping, spraying, showering or the like and (2) a so-called precoating method in which a hydrophilic film is formed on the surface of an aluminum plate by means of roll coating or the like and the resulting plate is subjected to press forming to produce fins. In the latter method (2), when the hydrophilic film contains inorganic component(s) such as silica, water glass, alumina, aluminum hydroxide, calcium carbonate, titania and/or the like, the mold used in press forming undergoes severe abrasion, inviting formation of defective fins, lower corrosion resistance owing to breakage of hydrophilic film and economical loss owing to shorter mold life.

Meanwhile, press forming is seeing a change. That is, conventional drawing (bulging and deep drawing) is being changed to drawless forming (ironing). When this severer forming is employed, the above-mentioned conventional methods for hydrophilization do not function appropriately.

In Japanese Patent Application Kokai (Laid-Open) No. 129366/1987 and Japanese Patent Application Kokai (Laid-Open) No. 372/1988 are proposed methods of coating a paint which is a mixture of an organic resin, organic fine particles or water-absorbing organic fine particles, and a surfactant. These methods have little problems during press forming but have a problem in hydrophilicity.

As seen above, a number of techniques were proposed for hydrophilization of heat exchanger fins. These techniques, however, are insufficient in retention of hydrophilicity, press formability, odor at the start of air cooling, and stability of paint to be coated.

The present inventors made a study on a composition for hydrophilization and a method for hydrophilization, both free from the above-mentioned problems of the prior art. As a result, the present inventors found out that a crosslinkable aqueous composition containing particular organic fine particles can provide fins having no problem in retention of hydrophilicity, press formability, odor at the start of air cooling operation, etc. and has good stability. The finding has led to the completion of the present invention.

According to the present invention there is provided a coating composition for hydrophilization comprising:

(A) a water-soluble or water-dispersible organic resin, (B) organic resin fine particles having a weight-average particle diameter/number-average particle diameter ratio of 1.2 or less and an average primary particle diameter of 0.1–1 μm, which are obtained by polymerizing 100 parts by weight of a monomer mixture consisting of:

0.1–10% by weight of (a) at least one monomer selected from the group consisting of monomers represented by the following formulas [1] or [2]

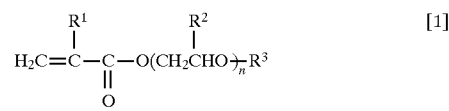  [1]

(wherein $R^1$, $R^2$ and $R^3$ are independently a hydrogen atom or an alkyl group of 1–4 carbon atoms, and n is a number of 1–25)

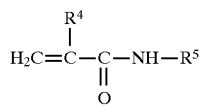

[wherein $R^4$ is a hydrogen atom or an alkyl group of 1–4 carbon atoms, and $R^5$ is a hydrogen atom, an alkyl group of 1–4 carbon atoms, an alkoxy group of 1–4 carbon atoms, a hydroxyalkyl group of 1–4 carbon atoms, or a group of the following formula [3]

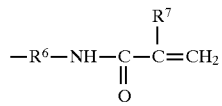

(wherein $R^6$ is a bivalent organic group, and $R^7$ is a hydrogen atom or an alkyl group of 1–4 carbon atoms)]

15–45% by weight of (b) a hydrophobic polyfunctional ethylenically unsaturated monomer, 45–84.9% by weight of (c) a hydrophobic monoethylenically unsaturated monomer, and 0–39.9% by weight of (d) an unsaturated monomer other than the monomers (a), (b) and (c), copolymerizable with the monomers (a),(b) and (c) in the presence of 1–40 parts by weight of (e) at least one polymer selected from the group consisting of a polyacrylic acid and a polymethacrylic acid, in a solvent capable of dissolving said monomer mixture and said polymer (e) but substantially incapable of dissolving a copolymer formed by the polymerization of said monomer mixture, and (C) a crosslinking agent.

According to the present invention, there is further provided a method for hydrophilization of heat exchanger fins, which comprises coating aluminum-made heat exchanger fins with the above coating composition for hydrophilization.

According to the present invention, there is furthermore provided aluminum-made heat exchanger fins coated with the above coating composition for hydrophilization.

The present invention is hereinafter described in more detail.

Water-Soluble or Water-Dispersible Organic Resin (A)

The water-soluble or water-dispersible organic resin used as the component (A) of the coating composition of the present invention may be a water-soluble or water-dispersible resin having functional group(s) such as hydroxyl group, carboxyl group, amino group and the like in the molecule. Examples of the organic resin (A) are an acrylic resin, an alkyd resin, a polyester resin, an epoxy resin, an olefin-carboxylic acid resin (e.g. an ethylene-acrylic acid copolymer), a polyvinyl alcohol, a polyvinylpyrrolidone, a polyamino resin, a polyamide resin, a natural polysaccharide and a derivative thereof, all having said functional group(s).

Preferable examples of the organic resin (A) are acidic resins such as carboxyl group-containing acrylic resin, carboxyl group-containing alkyd resin, carboxyl group-containing polyester resin, ethylene-acrylic acid copolymer and the like; basic resins such as amino group-containing acrylic resin, amine-added epoxy resin, polyamide-polyamine resin and the like;.and nonionic resins which are each water-soluble or water-dispersible by itself, such as polyvinyl alcohol, polyvinylpyrrolidone, natural polysaccharide, derivative thereof and the like. The acidic resins and basic resins may have hydroxyl group(s) in the molecule as necessary.

Particularly preferable of the above organic resins are an acrylic resin, an alkyd resin, a polyester resin each having hydroxyl group(s) and carboxyl group(s) in the molecule ethylene-acrylic acid copolymer, and a polyvinyl alcohol.

These organic resins can be made water-soluble or water-dispersible by neutralization with an appropriate compound depending upon the functional group(s) introduced into the resin skeleton. In the case of, for example, an acidic resin, it can be achieved by neutralizing the acidic resin with an amine compound, ammonia water, an alkali metal hydroxide or the like; and in the case of a basic resin, it can be achieved by neutralizing the basic resin with an organic acid (e.g. acetic acid or lactic acid) or a mineral acid (e.g. phosphate).

Organic Resin Fine Particles (B)

The organic resin fine particles used as the component (B) of the coating composition of the present invention are obtained by polymerizing 100 parts by weight of a monomer mixture consisting of:

0.1–10% by weight of (a) at least one monomer selected from the group consisting of monomers represented by the following formulas [1] or [2]

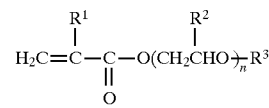

(wherein $R^1$, $R^2$ and $R^3$ are independently a hydrogen atom or an alkyl group of 1–4 carbon atoms, preferably a hydrogen atom or a methyl group, and n is an average polymerization degree of alkylene glycol such as ethylene glycol, propylene glycol or the like and is a number of 1–25, preferably 3–15, more preferably 3–10)

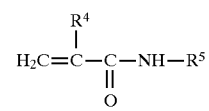

[wherein $R^4$ is a hydrogen atom or an alkyl group of 1–4 carbon atoms, preferably a hydrogen atom or a methyl group, and $R^5$ is a hydrogen atom, an alkyl group of 1–4 carbon atoms, an alkoxy group of 1–4 carbon atoms, a hydroxyalkyl group of 1–4 carbon atoms or a group of the following formula [3], preferably a hydrogen atom or a group of formula [3]

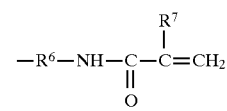

(wherein $R^6$ is a bivalent organic group, preferably a lower (i.e. 1–6 carbon atoms) alkylene group such as methylene, ethylene or the like, and $R^7$ is a hydrogen atom or an alkyl group of 1–4 carbon atoms, preferably a hydrogen atom or a methyl group)]

15–45% by weight of (b) a hydrophobic polyfunctional ethylenically unsaturated monomer, 45–84.9% by weight of (c) a hydrophobic monoethylenically unsaturated monomer, and 0–39.9% by weight of (d) an unsaturated monomer other than the monomers (a), (b) and (c), copolymerizable with the monomers (a), (b) and (c) in the presence of 1–40 parts by weight of (e) at least one polymer selected from the group consisting of a polyacrylic acid and a polymethacrylic acid, in a solvent capable of dissolving said monomer mixture and said polymer (e) but substantially incapable of dissolving a copolymer formed by the polymerization of said monomer mixture.

The monomer (a) represented by formula [1] includes, for example, a polyethylene glycol mono(meth)acrylate, a polypropylene glycol mono(meth)acrylate, a methoxypolyethylene glycol mono(meth)acrylate and a methoxypolypropylene glycol mono(meth)acrylate. Of these monomers, a methoxypolyethylene glycol mono(meth)acrylate is preferably used because it provides organic resin fine particles very superior in suppression of water bridge formation. In the above compound names, "(meth)acrylate" refers to methacrylate or acrylate, and the same applies hereinafter.

Specific examples of the monomer (a) represented by formula [2] are methylene bis[(meth)acrylamide], ethylene bis[(meth)acrylamide], (meth)acrylamide, N-methylol (meth)acrylamide. Of these monomers, a combination of acrylamide and methylene bis(acrylamide) is preferably used because it provides organic resin fine particles very superior in suppression of water bridge formation. In the above compound names, "(meth)acrylamide" refers to methacrylamide or acrylamide, and the same applies hereinafter.

The above-mentioned monomers (a) can be used independently or in combination of two or more. The amount of the monomer (a) used can be 0.1–10% by weight, preferably 0.5–7% by weight, more preferably 1–5% by weight based on the weight of the mixture of monomers (a) to (d). An amount of the monomer (a) less than 0.1% by weight tends to give organic resin fine particles which impart lower hydrophilicity, and an amount of the monomer (a) more than 10% by weight tends to give organic resin fine particles having a wider particle diameter distribution.

The hydrophobic polyfunctional ethylenically unsaturated monomer (b) used in the production of the organic resin fine particles (B) includes an unsaturated monomer having a water solubility at 20° C., of 5% by weight or less, preferably 1% by weight or less and containing two or more, preferably two or three ethylenically unsaturated bonds in the molecule. Examples of such a hydrophobic polyfunctional ethylenically unsaturated monomer (b) are aromatic divinyl compounds such as divinylbenzene and the like; poly(meth)acrylate compounds such as polyethylene glycol di(meth)acrylate, polypropylene glycol di(meth)acrylate, trimethylolpropane tri(meth)acrylate, pentaerythritol tri (meth)acrylate and the like; and conjugated dienes such as 1,3-butadiene, isoprene and the like. Of these monomers, divinylbenzene is preferable because it gives organic resin fine particles having a narrower particle diameter distribution and very high heat resistance.

The amount of the hydrophobic polyfunctional ethylenically unsaturated monomer (b) may be 15–45% by weight, preferably 17–44% by weight, more preferably 18–43% by weight based on the weight of the mixture of monomers (a) to (d). An amount of the monomer (b) less than 15% by weight tends to give organic resin fine particles having reduced heat resistance, and an amount of the monomer (b) more than 45% by weight tends to give organic resin fine particles having a wider particle diameter distribution.

The hydrophobic monoethylenically unsaturated monomer (c) used in the production of the organic resin fine particles (B) includes an unsaturated monomer having a water solubility at 20° C., of less than 5% by weight, preferably less than 1% by weight and containing one ethylenically unsaturated bond in the molecule. Examples of such a hydrophobic monoethylenically unsaturated monomer (c) are aromatic monovinyl compounds such as styrene, α-methylstyrene, p-methylstyrene, chloromethylstyrene, halogenated styrene and the like; and hydrophobic alkyl or glycidyl esters of (meth)acrylic acid, such as methyl (meth) acrylate, ethyl (meth)acrylate, butyl (meth)acrylate, 2-ethylhexyl (meth)acrylate, lauryl (meth)acrylate, stearyl (meth)acrylate, glycidyl (meth)acrylate and the like. Of these hydrophobic monoethylenically unsaturated monomers (c), aromatic monovinyl compounds are used preferably because they give organic resin fine particles having a narrower particle diameter distribution.

The amount of the hydrophobic monoethylenically unsaturated monomer (c) used may be 45–84.9% by weight, preferably 47–83% by weight, more preferably 50–81% by weight based on the weight of the mixture of monomers (a) to (d). An amount of the monomer (c) less than 45% by weight gives organic resin fine particles having a wider particle diameter distribution, and an amount of the monomer (c) more than 84.9% by weight gives organic resin fine particles which have reduced heat resistance and impart lower hydrophilicity.

In the present invention, in the production of the organic resin fine particles (B), it is possible to use as necessary, in addition to the monomers (a), (b) and (c), other unsaturated monomer (d) copolymerizable with the monomers (a), (b) and (c). The other monomer (d) includes, for example, ethylenically unsaturated carboxylic acids (e.g. acrylic acid, methacrylic acid and maleic acid) and salts thereof; and ethylenically unsaturated sulfonic acids (e.g. styrenesulfonic acid) and salts thereof. Of these monomers (d), ethylenically unsaturated carboxylic acids can give increased stability in the production of organic resin fine particles and the resulting organic resin fine particles can impart higher hydrophilicity.

The amount of the monomer (d) used can be varied appropriately depending upon, for example, the properties required for the organic resin fine particles to be obtained, but may be 0–39.9% by weight, preferably 0.1–35% by weight, more preferably 0.1–31% by weight based on the weight of the mixture of monomers (a) to (d). An amount of the monomer (d) more than 39.9% by weight tends to give organic resin fine particles having a wider particle diameter distribution.

The mixture of monomers (a) to (d) is polymerized in the presence of (e) at least one polymer selected from the group consisting of a polyacrylic acid and a polymethacrylic acid, in a solvent capable of dissolving said monomer mixture and said polymer (e) but substantially incapable of dissolving a copolymer formed by the polymerization of said monomer mixture, whereby the organic resin fine particles used as the component (B) of the coating composition of the present invention can be produced.

In the above polymerization, the polymer (e) acts as a dispersion stabilizer. The polymer (e) preferably has a viscosity of generally 100–500,000 cps, preferably 50,000–150,000 cps when measured at 20° C. for an aqueous solution containing 20% by weight of the polymer (e), using a Brookfield viscometer (rotor #2, 600 rpm). When the polymer (e) has too low a viscosity, the resulting organic resin fine particles tend to have a wider particle diameter distribution. When the polymer (e) has too high a viscosity, agglomerates tend to appear during the production of organic resin fine particles.

The polymer (e) can be used in an amount of 1–40 parts by weight, preferably 5–30 parts by weight, more preferably 10–30 parts by weight per 100 parts by weight of the monomer mixture. When the amount of the polymer (e) used is less than 1 part by weight, the polymerization stability during the production of organic resin fine particles is low, which may invite the formation of a large amount of coagula. When the amount is more than 40 parts by weight, the concentration of the monomer mixture is low, which tends to invite reduced productivity.

As the solvent usable in the above polymerization, capable of dissolving the monomer mixture and the polymer (e) but substantially incapable of dissolving a copolymer formed by the polymerization of the monomer mixture, there can be cited organic solvents, for example, lower alcohols such as methyl alcohol, ethyl alcohol, propyl alcohol, butyl alcohol and the like; ketones such as acetone, methyl ethyl ketone and the like; heterocyclic compounds such as pyridine, pyrrole, tetrahydrofuran and the like; aliphatic hydrocarbons such as n-hexane, cyclohexane and the like; aromatic hydrocarbons such as benzene, toluene and the like; and halogenated hydrocarbons such as methylene chloride, chloroform and the like. Of these solvents, lower alcohols having 1–4 carbon atoms are preferred. These solvents may be used independently or in combination of two or more.

The amount of the solvent used is not particularly restricted and can be varied in a wide range depending upon the kinds of the monomers and polymer (e) used, etc., but appropriately is generally 100–2,000 parts by weight, preferably 500–2,000 parts by weight per 100 parts by weight of the monomer mixture.

As necessary, the solvent may be used as a mixture with water. The amount of water when it is used, can be generally 100 parts by weight or less, preferably 80 parts by weight or less per 100 parts by weight of the organic solvent.

The polymerization of the monomer mixture can be conducted by dispersion polymerization which is known per se. It is specifically conducted, for example, by feeding, into a reactor, a solvent, a total amount of a monomer (a), a monomer (b), a monomer (c), optionally a monomer (d), and a poly(meth)acrylic acid (e) to dissolve them in the solvent to prepare a uniform solution, followed by polymerization, or by feeding, into a reactor containing a solvent, part of a mixture of a monomer (a), a monomer (b), a monomer (c) and optionally a monomer (d) and a total amount of a poly(meth)acrylic acid (e) to dissolve them in the solvent to prepare a uniform solution, followed by polymerization, and then adding the remainder of the monomer mixture, followed by polymerization (this latter process is hereinafter referred to as multistep polymerization). Of these polymerizations, multistep polymerization is preferred because it can provide organic resin fine particles which impart excellent hydrophilicity.

In the multistep polymerization, the ratio of the amount of the monomer mixture fed first and the amount of the monomer mixture added later is preferably such that the amount of the monomer mixture added later is generally 150 parts by weight or less, preferably 120 parts by weight or less per 100 parts by weight of the amount of the monomer mixture fed first. As the amount of the monomer mixture added later becomes larger, the resulting organic resin fine particles generally tend to have a larger weight-average particle diameter/number-average particle diameter ratio.

The polymerization can be conducted generally in the presence of a polymerization initiator such as potassium persulfate, ammonium persulfate, t-butyl hydroperoxide, t-butyl peroxybenzoate, cumene hydroperoxide, lauroyl peroxide, 2,2'-azobisisobutyronitrile, azobisdimethylvaleronitrile or the like. The polymerization temperature is selected generally in the range of about 20° C. to about 100° C. depending upon the kind of the polymerization initiator used, etc.

The organic resin fine particles produced by the above polymerization are required to have:

(1) a weight-average particle diameter/number-average particle diameter ratio of 1.2 or less, preferably 1.15 or less, more preferably 1.1 or less, and (2) an average primary particle diameter of 0.1–1.0 $\mu$m, preferably 0.2–0.8 $\mu$m, more preferably 0.2–0.6 $\mu$m.

Organic resin fine particles having a weight-average particle diameter/number-average particle diameter ratio of more than 1.2, when used in a coating composition, generally are not suited for formation of convex parts of uniform height on the surfaces of aluminum fins. Incidentally, a smaller weight-average particle diameter/number-average particle diameter means a narrower particle diameter distribution. Organic resin fine particles having an average particle diameter (both weight-average particles and number-average particles) of less than 0.1 $\mu$m, when used in a coating composition, are unable to form convex parts on the surface of coating film. Organic resin fine particles having an average particle diameter of more than 1.0 $\mu$m, when used in a coating composition and coated on aluminum fins, give a film of reduced thermal conductivity, unsuitable for heat exchangers. Such a coating composition also tends to have reduced coatability. Herein, "primary particle" refers to each individual unit particle not agglomerated.

Crosslinking Agent (C)

The crosslinking agent used in the present coating composition is compounded to allow the film formed with said composition to have improved properties in water resistance, chemical resistance, solvent resistance, etc. Typical examples of the crosslinking agent (C) include at least one crosslinking agent selected from the group consisting of an amino resin, a polyepoxy compound, a blocked polyisocyanate compound and a metal chelate compound of an element selected from Ti, Zr and Al.

The amino resin used as the crosslinking agent includes, for example, methylolated amino resins obtained by the reaction of an amine component (e.g. melamine, urea, benzoguanamine, acetoguanamine, steroguanamine, spiroguanamine or dicyandiamide) with an aldehyde. The aldehyde includes formaldehyde, paraformaldehyde, acetaldehyde, benzaldehyde, etc. The amino resin also includes ethers obtained by etherifying the above methylolated amino resin with an appropriate alcohol. Examples of the alcohol used for the etherification are methyl alcohol, ethyl alcohol, n-propyl alcohol, isopropyl alcohol, n-butyl alcohol, isobutyl alcohol, 2-ethylbutanol and 2-ethylhexanol.

The polyepoxy compound used as the crosslinking agent is a compound having at least two epoxy groups in the molecule. Typical examples thereof are polyglycidyl ethers of polyhydric alcohols or polyhydric phenols, such as ethylene glycol diglycidyl ether, hexanediol diglycidyl ether, neopentyl glycol diglycidyl ether, glycerine diglycidyl ether, glycerine triglycidyl ether, diglycerine triglycidyl ether, sorbitol polyglycidyl ether, hydrogenated bisphenol A diglycidyl ether, bisphenol A diglycidyl ether and the like; glycidyl ethers of glycidyl esters, such as glycidyl p-oxybenzoate glycidyl ether and the like; polyglycidyl esters of polycarboxylic acids, such as diglycidyl phthalate, diglycidyl hexahydrophthalate and the like; polyepoxy compounds having a nitrogen-containing hetero cycle such as hydantoin ring or the like; epoxy resins which are adducts between a compound having two or more epoxy groups in the molecule and a polyhydric alcohol, a polyhydric phenol or a polybasic acid; modified epoxy resins such as fatty acid-modified epoxy resin, amine-modified epoxy resin and the like; and vinyl polymers having epoxy group(s) as side chain(s).

The blocked polyisocyanate compound used as the crosslinking agent is a compound having two or more blocked isocyanate groups in the molecule. It includes, those compounds obtained by blocking, with an ordinary isocyanate-blocking agent, the isocyanate groups of a polyisocyanate compound such as aliphatic, alicyclic, heterocyclic or aromatic polyisocyanate compound, polymer thereof, adduct obtained by partial reaction of said polyisocyanate compound with polyhydric alcohol, or the like.

The polyisocyanate compound includes hexamethylene diisocyanate, isophorone diisocyanate, 1,4-cyclohexane diisocyanate, methylcyclohexane-2,4-diisocyanate, xylylene diisocyanate, tolylene diisocyanate, 4,4'-diphenylmethane diisocyanate, etc.

The metal chelate compound used as the crosslinking agent is a metal chelate compound selected from titanium chelate compound, zirconium chelate compound and aluminum chelate compound. Typical examples of the metal chelate compound include coordination compounds (complex compounds) each having two or more, preferably two to three metal alkoxide bonds (including alkoxyl-substituted alkoxide bonds), obtained by bonding, to an alkoxide compound or alkoxy group-substituted alkoxide compound represented by general formula $(R^8)_{4-n}M(R^9)_n$ (M is Ti or Zr) or general formula $(R^8)_{3-m}M(R^9)_m$ (M is Al) [wherein n is an integer of 2–4; m is an integer of 2–3; $R^8$ is a substituent such as alkyl group having 1–6 carbon atoms (e.g. ethyl group, amyl group), phenyl group, vinyl group, β-(3,4-epoxycyclohexyl) group, γ-mercaptopropyl group, aminoalkyl group or the like; and $R^9$ is an alkoxy group ordinarily having 1–8 carbon atoms (e.g. methoxy group, ethoxy group, n-propoxy group, isopropoxy group, n-butoxy group, isobutoxy group, sec-butoxy group, tert-butoxy group, n-pentoxy group, isopentoxy group, n-hexoxy group, n-heptoxy group or n-octoxy group) or an alkoxy-substituted alkoxy group having 2–10 total carbon atoms (e.g. methoxymethoxy group, methoxyethoxy group, ethoxybutoxy group or butoxypentoxy group)], a ligand such as dicarboxylic acid (e.g. maleic acid), ketone alcohol (e.g. diacetone alcohol), diketone (e.g. acetylacetone), ketone ester (e.g. ethyl acetoacetate), diester (e.g. ethyl malonate), salicylic acid, salicylaldehyde, phenol having two or more phenolic hydroxyl groups (e.g. catechol or pyrogallol), alkanolamine (e.g. triethanolamine, diethanolamine or dimethylaminoethanol) or the like.

These crosslinking agents can be used independently or in combination of two or more. When the organic resin (A) is a resin of high polarity, it is preferable to use a metal chelate compound which has little fear of orienting to the surface of the formed coating film to cause the film to have no desired hydrophilicity.

Coating Composition for Hydrophilization

The coating composition of the present invention can be prepared by mixing the organic resin (A), the organic resin fine particles (B) and the crosslinking agent (C) all mentioned above. The mixing proportions of the components (A), (B) and (C) can be varied appropriately depending upon the properties required for the composition to be obtained, etc., but can ordinarily be as follows. [In the following, parts by weight are per 100 parts by weight of the total of the components (A), (B) and (C).]

| Component | General range (parts by wt.) | Preferable range (parts by wt.) | More preferable range (parts by wt.) |
|---|---|---|---|
| (A) | 20–88 | 30–80 | 50–75 |
| (B) | 10–50 | 15–45 | 20–40 |
| (C) | 2–30 | 3–25 | 5–20 |

In the heat exchanger fins treated with the present coating composition, the contact angle between fin and water is desirably 5° or less (so-called extended wetting) when the heat exchanger has, for example, a fin-to-fin pitch of 1.2 mm or less. To meet this requirement, the present composition can further contain, as necessary, a surfactant having a wetting action as the component (D).

The surfactant (D) may be any of anionic, cationic, amphoteric or nonionic surfactants as long as it has a surface-wetting action. Typical examples of the surfactant (D) usable include a salt of a dialkyl sulfosuccinate and an alkylene oxide silane compound.

The salt of a dialkyl sulfosuccinate includes compounds represented by the following formula [4]

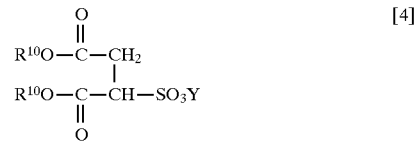

(wherein two $R^{10}$ may be the same or different and are each an alkyl group of 1–18 carbon atoms, and Y is an alkali metal selected from lithium, sodium and potassium, an ammonium group or an amino group).

Typical examples of the alkylene oxide silane compound are compounds represented by the following formula [5]

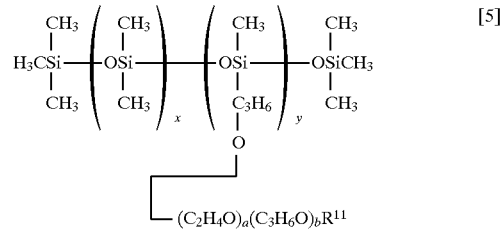

(wherein x is an integer of 5–20; y is an integer of 1–8; a is an integer of 5–20; b is an integer of 0–15; and $R^{11}$ is an alkyl group of 1–6 carbon atoms).

These surfactants can be used independently or in combination of two or more. The amount of the surfactant used is 20 parts by weight or less, preferably 0.5–10 parts by weight, more preferably 1–5 parts by weight per 100 parts by weight of the total of the components (A), (B) and (C).

The coating composition of the present invention can furthermore contain, as necessary, an antifungal agent as the component (E) in order to prevent the breeding of microorganisms. The antifungal agent (E) preferably satisfies the following requirements (1) to (5).

(1) Has low toxicity and high safety.

(2) Is stable to heat, light, acids, alkalis, etc.; is sparingly soluble in water; and exhibits the antifungal action over a very long period of time.

(3) Has a fungicidal action or can prevent the breeding of fungi, at a low concentration.

(4) When compounded into a paint, shows no reduction in effect and does not impair the stability of the paint.

(5) Does not impair the hydrophilicity and corrosion resistance of the film formed.

An antifungal agent meeting the above requirements can be selected from per se known aliphatic or aromatic organic compounds having antifungal and fungicidal activities. It includes, for example, antifungal agents of haloarylsulfone type, iodopropargyl type, N-haloalkylthio type, benzthiazole type, nitrile type, pyridine type, 8-oxyquinoline type, benzthiazole type, isothiazoline type, phenol type, quaternary ammonium salt type, triazine type, thiazine type, anilide type, adamantane type, dithiocarbamate type, bromoindanone type, etc.

Specific examples of the antifungal agent are 2-(4-thiazolyl)-benzimidazole, N-(fluorodichloromethylthio)

phthalimide, N-dimethyl-N'-phenol-N'-(fluorodichloromethylthio)-sulfamide, o-phenylphenol, 10,10'-oxybisphenoxyarsine, 2,3,5,6-tetrachloro-4-(methylsulfonyl)pyridine, 2,4,5,6-tetrachloro-isophthalonitrile, diiodomethyl-p-toluylsulfone, methyl 2-benzimidazolecarbamate, bis(dimethylthiocarbamoyl) disulfide and N-(trichloromethylthio)-4-cyclohexene-1,2-dicarboxyimide. Antifungal agents of inorganic salt type can also be used, and typical examples thereof are barium metaborate, copper borate, zinc borate and zeolite (aluminosilicate).

These antifungal agents can be used independently or in combination. The amount of the antifungal agent used can be varied depending upon the kind of the agent, etc., but is generally 20 parts by weight or less, preferably 3–15 parts by weight per 100 parts by weight of the total of the components (A), (B) and (C) so that the stability and film formability of coating composition, the hydrophilicity of formed film, and the corrosion resistance of coated plate are not impaired.

The coating composition of the present invention can be prepared, for example, by dissolving or dispersing, in an aqueous medium, the components (A), (B) and (C) and, as necessary, the component (D) and/or the component (E). The aqueous medium is composed mainly of water and may further contain an organic solvent and a neutralizing agent.

The present coating composition may also contain, as necessary, a coloring pigment, a per se known rust-preventive pigment (e.g. chromate type, lead type or molybdic acid type), a rust preventive agent [e.g. phenolic carboxylic acid (e.g. tannic acid or gallic acid), salt thereof, organic phosphoric acid (e.g. phytic acid or phosphinic acid), metal biphosphate or nitrite].

The present coating composition can be coated on a substrate such as metal, glass, wood, plastic, cloth and the like; and, by baking the resulting film, a hydrophilic cured film can be formed. The film preferably has a thickness as cured, of 0.3–5 μm, particularly 0.5–3 μm. The baking can be conducted generally at about 80° C. to about 250° C. (in terms of the maximum temperature of substrate) for about 30 minutes to 15 seconds.

The present coating composition is useful for the hydrophilization of, in particular, aluminum-made heat exchanger fins. The hydrophilization of aluminum-made heat exchanger fins can be conducted by coating said fins with the present coating composition. It can be conducted, for example, by applying the present composition to an aluminum plate (or an aluminum-made heat exchanger) which is sufficiently degreased and as necessary subjected to a chemical treatment, by a per se known method such as dip coating, showering coating, spray coating, roll coating, electrophoretic coating or the like, followed by baking.

As described above, the present coating composition can form, on a substrate, a hydrophilic film which has retainability of hydrophilicity (whole-surface wettability with water and contact angle to water, of 20° or less) and continuous formability (resistance to mold abrasion) (the prior art has been inferior in these properties) and yet has excellent corrosion resistance. Further, the composition, when containing an antifungal agent, can significantly improve the odor caused by the breeding of fungi.

Thus, the use of aluminum-made heat exchanger fins treated with the present coating composition can achieve energy saving and resource saving in heat exchangers.

The present invention is hereinafter described specifically by way of Examples and Comparative Examples. These Examples are for detailed description of the present invention and give no restriction to the scope of the present invention. In the followings, parts and % are parts by weight and % by weight, respectively.

Production of Aqueous Organic Resin Solutions

Production Example 1

180 parts of isopropyl alcohol was fed into a one-liter four-necked flask provided with a thermometer, a stirrer, a condenser and a dropping funnel. The gas inside the flask was replaced by nitrogen and the temperature inside the flask was controlled to about 85° C. Thereto was dropwise added, in about 2 hours, a mixture of (1) a monomer mixture consisting of 140 parts of ethyl acrylate, 68 parts of methyl methacrylate, 15 parts of styrene, 15 parts of N-n-butoxyethylacrylamide, 38 parts of 2-hydroxyethyl acrylate and 24 parts of acrylic acid and (2) 6 parts of 2,2'-azobis (2,4-dimethylvaleronitrile) as catalyst, to give rise to a reaction. After the completion of the dropwise addition, the reaction was continued for a further 5 hours at the same temperature to obtain a colorless transparent resin solution having a solid content of about 63% and an acid value of about 67, at a conversion of about 100%. To 500 parts of this resin solution was added 108 parts of dimethylaminoethanol. Water was added thereto, followed by thorough stirring, to obtain an aqueous acrylic copolymer dispersion having a solid content of 20% and a pH of about 10.

Production Example 2

Into a flask were fed 100 parts of linseed oil, 70 parts of trimethylolpropane and 0.07 part of litharge. The mixture was heated to 220° C. in a nitrogen stream with stirring and subjected to a reaction at the same temperature for 30 minutes. The reaction mixture was cooled to 70° C. Thereto were added 110 parts of phthalic anhydride and 13 parts of xylol. The mixture was heated to 220° C. with stirring and subjected to a reaction under xylol refluxing. The reaction was terminated when the acid value of the reaction mixture decreased to 15, and the reaction mixture was cooled to 80° C. Thereto were added 38 parts of xylol and 32 parts of ethylene glycol monoethyl ether to obtain an alkyd resin solution having a solid content of about 70%, an acid value of 15 and a hydroxyl group equivalent of about 1,200. 500 parts of this resin solution was mixed with 20 parts of triethylamine. Water was added thereto, followed by thorough stirring, to obtain an aqueous alkyd resin dispersion having a solid content of 20% and a pH of about 10.

Production Example 3

500 parts of a bisphenol type epoxy resin [Epikote 1001 (trade name) manufactured by Shell Chemical Co., an epoxy equivalent of 500] was dissolved in 200 parts of diacetonealcohol methyl ether. Thereto were dropwise added 50.5 parts of diisopropylamine and 21.5 parts of diethanolamine at 60°–80° C. The mixture was heated at 100° C. for 1 hour to obtain an amine-modified epoxy resin solution having an amine value of 68 and a hydroxyl group equivalent of about 820. 500 parts of this resin solution was mixed with 30 parts of acetic acid. Water was added thereto, followed by thorough stirring, to obtain an aqueous amine-modified epoxy resin dispersion having a solid content of 20% and a pH of about 6.

Production Example 4

315 parts of water was fed into a four-necked flask. Therein was dissolved, at 85° C. with stirring, 60 parts of a flaky polyvinyl alcohol (Poval PVA-117 manufactured by Kuraray Co., Ltd.) having a saponification value of 98.0–99.4, to obtain an aqueous polyvinyl alcohol solution having a solid content of 16%.

Production of Organic Resin Fine Particles
Production Example 5

Into a reactor were fed 250 parts of deionized water, 590 parts of ethyl alcohol, 0.95 part of potassium persulfate and 14 parts of methacrylic acid. Stirring was conducted for 30 minutes to obtain a uniform mixture. The mixture was heated to 70° C. to start a reaction and was maintained at that temperature for 6 hours. The reaction mixture was cooled to 20° C. to obtain a polymethacrylic acid. The conversion was 90%.

Into the reactor were added 0.5 part of potassium persulfate and 75.8 parts of styrene, and polymerization was started at 70° C. After 1 hour, there was added 3 parts of methoxypolyethylene glycol monomethacrylate (average polymerization degree of polyethylene glycol n=9), followed by addition of 20 parts of divinylbenzene. Polymerization was continued until 11 hours passed from the start of polymerization, to obtain organic resin fine particles.

Production Examples 6 and 7

Organic resin fine particles were obtained in the same manner as in Production Example 5 except that the polymerization recipe of Production Example 5 were changed to those shown in Table 1.

TABLE 1

|  | Production Examples | | |
| --- | --- | --- | --- |
|  | 5 | 6 | 7 |
| Water (parts) | 250 | 250 | 250 |
| Ethyl alcohol (parts) | 590 | 590 | 590 |
| Potassium persulfate (part) | 0.95 | 0.95 | 0.95 |
| Methacrylic acid (parts) | 14 | 14 | 14 |
| Conversion of methacrylic acid (%) | 90 | 90 | 90 |
| Potassium persulfate (part) | 0.5 | 0.5 | 0.5 |
| Styrene (parts) | 75.8 | 75.8 | 78.6 |
| Methoxypolyethylene glycol monomethacrylate (parts) | 3 | — | — |
| Methylene bis(acrylamide) (parts) | — | 1.5 | — |
| Acrylamide (parts) | — | 1.5 | — |
| Divinylbenzene (parts) | 20 | 20 | 20 |
| Conversion of total monomers (%) | 93 | 94 | 93 |
| Average particle diameter ($\mu$m) | 0.5 | 0.5 | 0.5 |
| Weight-average particle diameter/number-average particle diameter | 1.04 | 1.05 | 1.10 |

Incidentally, the organic resin fine particles of Production Examples 5 and 6 are those used in Examples of the present invention and Comparative Examples 2–4, and the organic resin fine particles of Production Example 7 are those used in Comparative Example 5.

Particle diameter was obtained by taking a photograph of particles by the use of a scanning electron microscope, selecting 300 particles at random in the photograph, and measuring each diameter of these particles. Also, using the following formulas 1 and 2, number-average particle diameter Dn and weight-average particle diameter Dw were calculated.

$$Dn = \Sigma DiNi/\Sigma Ni \quad \text{(Formula 1)}$$

$$Dw = \Sigma (Di)^4 Ni / \Sigma (Di)^3 Ni \quad \text{(Formula 2)}$$

wherein Di is a particle diameter and Ni is a number of particles having a diameter of Di.

Example 1

There were mixed 55 parts (solid content) of the aqueous acrylic copolymer dispersion obtained in Production Example 1, 40 parts (solid content) of the organic resin fine particles obtained in Production Example 5 and 5 parts (solid content) of a melamine resin [Cymel 325 (trade name) manufactured by Mitsui-Cytec, Ltd., solid content=80%). Thereto was added water to obtain a composition for hydrophilization, having a solid content of 15%.

Examples 2–13 and Comparative Examples 1–5

Compositions for hydrophilization, each having a solid content of 15% were obtained in the same manner as in Example 1 except that in each Example or Comparative Example there were used an aqueous organic resin solution, an organic resin fine particles, a crosslinking agent, a surfactant and an antifungal agent each shown in Table 2, of kinds and amounts shown in Table 2.

In Table 2, each amount is in terms of solid content.

The kinds of the crosslinking agents, surfactants and antifungal agents shown in Table 2 are as follows.

Crosslinking Agents

A: Cymel 325 (trade name) manufactured by Mitsui-Cytec, Industries, which is a methylated melamine resin.

B: Cymel UFR 65 (trade name) manufactured by Mitsui-Cytec, Industries, which is a methylated urea resin.

C: Denacol EX614 (trade name) manufactured by Nagase Chemicals Ltd., which is a sorbitol polyglycidyl ether resin.

D: Takenate B870 (trade name) manufactured by Takeda Chemical Industries, Ltd., which is an blocked isophorone diisocyanate compound.

E: Aluminum Alcoholate ALCH (trade name) manufactured by Kawaken Fine Chemicals Co., Ltd., which is composed mainly of diisopropoxy[ethylacetoacetato] aluminum (III).

F: Titabond 50 (trade name) manufactured by Nippon Soda Co., Ltd., which is composed mainly of diisopropoxybis(acetylacetonato)titanium (IV).

G: A product which is obtained by mixing 36.7 parts of tetra-n-butyl zirconate with 21.4 parts of diethanolamine and keeping the mixture at 50° C. for 24 hours and which is composed mainly of a compound represented by $Zr(O-n-C_4H_9)_2[OCH_2CH_2NHCH_2CH_2OH]_2$.

Surfactants a: Newcol 290M (trade name) manufactured by Nippon Nyukazai Co., Ltd., which is sodium salt of dialkyl sulfosuccinate.

b: Silwet L-77 (trade name) manufactured by Nippon Unicar Company Limited, which is an alkylene oxide silane compound represented by the afore-mentioned formula [5].

Antifungal Agents

I: 2-(4-Thiazolyl)benzimidazole

II: Methyl 2-benzimidazolecarbamate

III: Zinc bis[1-hydroxy-2(H)pyridinethionate]

IV: 2,4,5,6-Tetrachloroisophthalonitrile

V: N-(fluorodichloromethylthio)phthalimide

VI: Butyl p-oxybenzoate

Each of the compositions for hydrophilization, obtained in the above Examples and Comparative Examples was coated, in a film thickness (as dried) of 1 micron, on an aluminum plate (A1050 having a thickness of 0.1 mm) which had been subjected to (1) degreasing using an aqueous solution containing 2% of an alkali degreasing agent [Chemi-Cleaner 561B (trade name) manufactured by The Japan Cee Bee Chemical Co., Ltd.] and (2) a chromate treatment [amount (in terms of metal chromium) coated: 30 mg/m$^2$] using a chromate treating agent [Alchrom 712 (trade name) manufactured by Nihon Parkerizing Company Limited]. Baking was conducted for 30 seconds using a hot air of 220° C. so that the maximum temperature of substrate became 215° C., whereby coated plates were obtained.

A volatile lubricating oil for press forming was coated on each of the coated plates, followed by drying at 150° C. for 5 minutes, whereby coated plates for testing were obtained. These plates were tested for hydrophilicity, corrosion resistance and antifungal property. The results are shown in Table 3.

The tests in Table 3 were conducted according to the following test methods.

Film Appearance

A coated plate for testing was evaluated visually. A plate whose film had no abnormality, was rated as ○.

Hydrophilicity

Wettability with water and angle of contact with waterdrop were measured according to the following methods, for (1) a coated plate for testing and (2) a coated plate obtained by repeating five times (5 cycles) a wet and dry cycle which comprised dipping the plate (1) in a running tap water (flow rate=15 kg per $m^2$ of plate per hour) for 7 hours, pulling up and drying in a room for 17 hours.

Wettability With Water

A coated plate for testing or a coated plate after wet and dry cycles was dipped in a beaker containing tap water and then pulled up. The condition of wetting with water, of the surface of the pulled-up plate was rated visually.

○: Even 10 seconds after pulling-up, the whole surface is wet with water and there is no uneven distribution of water.

Δ: The whole surface is wet with water immediately after pulling-up. 10 seconds after pulling-up, however, water is gathered from edge portion to the center portion of plate.

X: Waterdrops are formed immediately after pulling-up and no surface portion is wet with water.

Contact Angle

Contact angle between (a) coated plate for testing or coated plate after wet and dry cycles and (b) water was measured by drying the plate at 80° C. for 5 minutes, cooling the plate to a room temperature in a desiccator and conducting contact angle measurement by the use of Contact-Angle Meter DCAA manufactured by Kyowa Interface Science Co., Ltd.

Corrosion Resistance

This was measured by JIS Z 2371 (Method of Salt Spray Testing). The test duration was 500 hours.

- A case where there was neither white rust nor bulging, was rated as good (○).
- A case where there was slight white rust or slight bulging, was rated as slightly inferior (Δ).

Antifungal Property

This was measured under the following conditions, and the condition of breeding of fungi on film surface after given length of time (28 days) was rated visually.

A peptone glucose medium was made in a sterilization dish. Thereon was placed a coated plate for testing. Thereon was sprayed a dispersion of mixed spores of *Cladosporium sp., Penicillum sp., Altarnaria sp., Aspergillus sp.* and *Trichoderma sp.*, in peptone glucose, followed by incubation at 26°±2° C.

5: No fungi breeding is seen.

4: The area of fungi breeding on film surface is 10% or less.

3: The area of fungi breeding on film surface is more than 10% but not more than 30%.

2: The area of fungi breeding on film surface is more than 30% but not more than 50%.

1: The area of fungi breeding on film surface is more than 50%.

TABLE 2

| | Aqueous organic resin | | Organic resin fine particles | | Crossing agent | | Surfactant | | Antifungal agent | |
|---|---|---|---|---|---|---|---|---|---|---|
| | Production Example | Amount | Production Example | Amount | Kind | Amount | Kind | Amount | Kind | Amount |
| Example 1 | 1 | 55 | 5 | 40 | A | 5 | — | — | — | — |
| Example 2 | 2 | 65 | 5 | 25 | B | 10 | a | 1 | — | — |
| Example 3 | 3 | 70 | 5 | 15 | C | 15 | b | 3 | — | — |
| Example 4 | 4 | 55 | 5 | 40 | D | 5 | — | — | — | — |
| Example 5 | 1 | 60 | 5 | 30 | E | 10 | a | 3 | — | — |
| Example 6 | 1 | 65 | 6 | 25 | F | 10 | b | 1 | — | — |
| Example 7 | 1 | 70 | 6 | 20 | G | 10 | — | — | — | — |
| Example 8 | 2 | 70 | 5 | 20 | A | 10 | a | 2 | I | 5 |
| Example 9 | 2 | 55 | 6 | 35 | A | 10 | b | 5 | II | 5 |
| Example 10 | 3 | 55 | 5 | 40 | B | 5 | — | — | III | 10 |
| Example 11 | 3 | 65 | 5 | 30 | B | 5 | a | 5 | IV | 10 |
| Example 12 | 4 | 65 | 6 | 30 | F | 5 | b | 2 | V | 15 |
| Example 13 | 4 | 75 | 6 | 20 | F | 5 | — | — | VI | 15 |
| Comparative 1 | 1 | 90 | — | — | A | 10 | a | 5 | — | — |
| Comparative 2 | 1 | 85 | 5 | 5 | C | 10 | b | 3 | — | — |
| Comparative 3 | 2 | 20 | 6 | 70 | E | 10 | a | 3 | — | — |
| Comparative 4 | 3 | 70 | 6 | 30 | — | — | b | 5 | — | — |
| Comparative 5 | 4 | 60 | 7 | 35 | G | 5 | a | 3 | — | — |

TABLE 3

| | Film appearance | Hydrophilicity | | | | corrosion resistance | Antifungal property |
| --- | --- | --- | --- | --- | --- | --- | --- |
| | | Initial | | After wet and dry cycles (5 cycles) | | | |
| | | Wettability with water | Angle of contact with water | Wettability with water | Angle of contact with water | | |
| Example 1 | ○ | ○ | 5–10° | ○ | 20° > | ○ | — |
| Example 2 | ○ | ○ | 5° > | ○ | 20° > | ○ | — |
| Example 3 | ○ | ○ | 5° > | ○ | 20° > | ○ | — |
| Example 4 | ○ | ○ | 5–10° | ○ | 20° > | ○ | — |
| Example 5 | ○ | ○ | 5° > | ○ | 20° > | ○ | — |
| Example 6 | ○ | ○ | 5° > | ○ | 20° > | ○ | — |
| Example 7 | ○ | ○ | 5–10° | ○ | 20° > | ○ | — |
| Example 8 | ○ | ○ | 5° > | ○ | 20° > | ○ | 5 |
| Example 9 | ○ | ○ | 5° > | ○ | 20° > | ○ | 5 |
| Example 10 | ○ | ○ | 5–10° | ○ | 20° > | ○ | 5 |
| Example 11 | ○ | ○ | 5° > | ○ | 20° > | ○ | 5 |
| Example 12 | ○ | ○ | 5° > | ○ | 20° > | ○ | 5 |
| Example 13 | ○ | ○ | 5–10° | ○ | 20° > | ○ | 5 |
| Comparative Example 1 | ○ | Δ | 45° | X | 60° | ○ | — |
| Comparative Example 2 | ○ | Δ | 35° | Δ | 48° | ○ | — |
| Comparative Example 3 | ○ | ○ | 5° > | ○ | 20° > | Δ | — |
| Comparative Example 4 | ○ | ○ | 5° > | ○ | 20° > | Δ | — |
| Comparative Example 5 | ○ | Δ | 30° | Δ | 45° | ○ | — |

What is claimed is:

1. A coating composition for hydrophilization comprising:

(A) a water-soluble or water-dispersible organic resin, (B) organic resin fine particles having a weight-average particle diameter/number-average particle diameter ratio of 1.2 or less and an average primary particle diameter of 0.1–1 μm, which are obtained by polymerizing 100 parts by weight of a monomer mixture consisting of:

0.1–10% by weight of (a) at least one monomer selected from the group consisting of monomers represented by the following formulas (1) or (2)

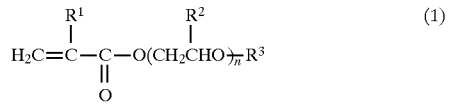

wherein $R^1$, $R^2$ and $R^3$ are independently a hydrogen atom or an alkyl group of 1–4 carbon atoms, and n is a number of 1–25,

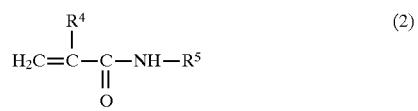

wherein $R^4$ is a hydrogen atom or an alkyl group of 1–4 carbon atoms, and $R^5$ is a hydrogen atom, an alkyl group of 1–4 carbon atoms, an alkoxy group of 1–4 carbon atoms, a hydroxyalkyl group of 1–4 carbon atoms, or a group of the following formula (3)

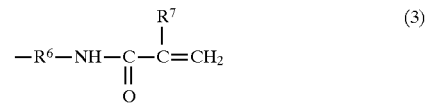

wherein $R^6$ is a bivalent organic group, and $R^7$ is a hydrogen atom or an alkyl group of 1–4 carbon atoms, 15–45% by weight of (b) divinylbenzene, 45–84.9% by weight of (c) styrene, and 0–39.9% by weight of (d) an unsaturated monomer other than the monomers (a), (b) and (c), copolymerizable with the monomers (a), (b) and (c) in the presence of 1–40 parts by weight of (e) at least one polymer selected from the group consisting of a polyacrylic acid and a polymethacrylic acid, in a solvent capable of dissolving said monomer mixture and said polymer (e) but substantially incapable of dissolving a copolymer formed by the polymerization of said monomer mixture, and (C) a crosslinking agent, the amount of (A) being 20–88 parts by weight, the amount of (B) being 10–50 parts by weight, and the amount of (C) being 2–30 parts by weight, per 100 parts by weight of the total of (A), (B) and (C).

2. A composition according to claim 1, wherein the organic resin (A) is selected from the group consisting of a carboxyl group-containing acrylic resin, a carboxyl group-containing alkyd resin, a carboxyl group-containing polyester resin, an ethylene-acrylic acid copolymer, an amino group-containing acrylic acid, an amine-added epoxy resin, a polyamidepolyamine resin, a polyvinyl alcohol, a polyvinylpyrrolidone, and a natural polysaccharide.

3. A composition according to claim 1, wherein the organic resin (A) is selected from the group consisting of an acrylic resin, an alkyd resin and a polyester resin each containing hydroxyl group(s) and carboxyl group(s), ethylene-acrylic acid copolymer and a polyvinyl alcohol.

4. A composition according to claim 1, wherein in the formula [1], $R^1$, $R^2$ and $R^3$ are independently a hydrogen atom or a methyl group, n is 3–15; and in the formula [2], $R^4$ is a hydrogen atom or a methyl group, $R^5$ is a hydrogen atom or a group of formula [3] wherein $R^6$ is a lower alkylene group and $R^7$ is a hydrogen atom or a methyl group.

5. A composition according to claim 1, wherein the monomer (a) is selected from a methoxypolyethylene glycol mono(meth)acrylate and a combination of acrylamide and methylene bis(acrylamide).

6. A composition according to claim 1, wherein the unsaturated monomer (d) is an ethylenically unsaturated carboxylic acid.

7. A composition according to claim 1, wherein the monomer mixture consists of:

0.5–7% by weight of the monomer (a),

17–44% by weight of the divinylbenzene (b),

47–83% by weight of the styrene (c), and 0.1–35% by weight of the unsaturated monomer (d), with the total of the monomers (a) to (d) being 100% by weight.

8. A composition according to claim 1, wherein the polymer (e) has a viscosity of 100–500,000 cps when measured at 20° C. for an aqueous solution containing 20% by weight of the polymer (e), using a Brookfield viscometer (rotor #2, 600 rpm).

9. A composition according to claim 1, wherein the polymer (e) has a viscosity of 50,000–150,000 cps when measured at 20° C. for an aqueous solution containing 20% by weight of the polymer (e), using a Brookfield viscometer (rotor #2, 600 rpm).

10. A composition according to claim 1, wherein the polymer (e) is used in an amount of 5–30 parts by weight per 100 parts by weight of the monomer mixture.

11. A composition according to claim 1, wherein the polymerization solvent is a lower alcohol of 4 or less carbon atoms.

12. A composition according to claim 1, wherein the polymerization solvent is used in an amount of 100–2,000 parts by weight per 100 parts by weight of the monomer mixture.

13. A composition according to claim 1, wherein the polymerization is conducted by multistep polymerization.

14. A composition according to claim 1, wherein the organic resin fine particles (B) have a weight-average particle diameter/number-average particle diameter ratio of 1.15 or less.

15. A composition according to claim 1, wherein the organic resin fine particles (B) have an average primary particle diameter of 0.2–0.8 μm.

16. A composition according to claim 1, wherein the crosslinking agent (C) is at least one crosslinking agent selected from the group consisting of an amino resin, a polyepoxy compound, a blocked polyisocyanate compound and a metal chelate compound of an element selected from Ti, Zr and Al.

17. A composition according to claim 1, which comprises the organic resin (A), the organic resin fine particles (B) and the crosslinking agent (C) in amounts of 30–80 parts by weight, 15–45 parts by weight and 2–30 parts by weight, respectively, per 100 parts by weight of the total of (A), (B) and (C).

18. A composition according to claim 1, which further comprises:

(D) a surfactant having a wetting action.

19. A composition according to claim 18, wherein the surfactant (D) is at least one surfactant selected from the group consisting of a salt of a dialkyl sulfosuccinate and an alkylene oxide silane compound.

20. A composition according to claim 18, which comprises the surfactant (D) in an amount of 20 parts by weight or less per 100 parts by weight of the total of (A), (B) and (C).

21. A composition according to claim 1, which further comprises:

(E) an antifungal agent.

22. A method for hydrophilization of heat exchanger fins, which comprises coating aluminum-made heat exchanger fins with a coating composition for hydrophilization set forth in claim 1.

23. Aluminum-made heat exchanger fins coated with a coating composition for hydrophilization set forth in claim 1.

* * * * *